United States Patent

[11] 3,583,523

| [72] | Inventors | Donald E. Williams<br>Santa Barbara;<br>John M. Stephenson, Camarillo, both of, Calif. |
|---|---|---|
| [21] | Appl. No. | 860,696 |
| [22] | Filed | Sept. 24, 1969 |
| [45] | Patented | June 8, 1971 |
| [73] | Assignee | The United States of America as represented by the Secretary of the Navy |

[54] BOUNDARY LAYER EFFECT ATTENUATOR
5 Claims, 3 Drawing Figs.

[52] U.S. Cl. .................................................. 181/33,
181/46, 73/12, 73/35
[51] Int. Cl. ........................................................ F01n 1/08,
G01n 33/22, F01n 7/00
[50] Field of Search............................................ 73/12, 35;
181/46, 56, 33, 35, 33.03, 60

[56] References Cited
UNITED STATES PATENTS

| 1,878,409 | 9/1932 | Lyford............................ | 181/33 |
| 2,595,047 | 4/1952 | Beranek......................... | 181/33 |
| 2,811,425 | 10/1957 | Houdry ......................... | 181/56UXR |
| 2,959,243 | 11/1960 | Smith ............................ | 181/56XR |
| 2,975,853 | 3/1961 | Friend........................... | 181/46XR |
| 2,977,787 | 4/1961 | Holcomb....................... | 73/12 |
| 3,038,552 | 6/1962 | Hedblom....................... | 181/56 |
| 3,170,483 | 2/1965 | Milroy........................... | 181/46XR |
| 3,327,628 | 6/1967 | Loprest et al.................. | 181/56UXR |
| 3,326,033 | 6/1967 | Stephenson et al........... | 73/35XR |
| 3,495,455 | 2/1970 | Allgood......................... | 73/12XR |

FOREIGN PATENTS

| 200,121 | 10/1958 | Austria.......................... | 181/46 |
| 31,630 | 10/1961 | Finland ......................... | 181/56 |
| 1,078,871 | 5/1954 | France .......................... | 73/181 |

*Primary Examiner*—Robert S. Ward, Jr.
*Attorneys*—Richard S. Sciascia, Q. Baxter Warner and Gayward N. Mann

ABSTRACT: A shock wave attenuator in which an axially arranged bundle of parallel tubes is enclosed in a rectangular housing. An arrangement of this type creates in effect a large length-to-diameter ratio of the housing which is responsible for attenuation of the shock wave.

PATENTED JUN 8 1971 3,583,523

INVENTORS
DONALD E. WILLIAMS
JOHN M. STEPHENSON
BY Hayward M. Mann
Q. Baxter Warner
ATTORNEYS 3,583,523

BOUNDARY LAYER EFFECT ATTENUATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

This invention relates generally to shock attenuation techniques and more particularly to air shock attenuators for protection from nuclear airblast effects.

2. Description of the Prior Art

In the past most passive attenuation techniques have included blast wave randomizers, sand filters, rock filters, expansion chambers, blast-actuated valves, etc. However, in order to be effective they have had to be either very large or to impose severe normal airflow restriction or both. In general such attenuation techniques have been opaque with respect to both the shock and the ensuing flow field. They functioned primarily by direct energy dissipation through either expansion or reflection of the impinging shock wave. The present novel attenuator, however, is unique because it does not depend on direct energy dissipation and is not opaque with regard to the flow field. Furthermore, the normal airflow is not subject to torturous or twisting flow patterns. Accordingly, the present attenuator offers minimal resistance to normal airflow with shock wave attenuation effected by choked flow fields through boundary layer formation. The means for muffling or silencing short, rapid sound waves are well known, as in the automobile exhaust muffler art, these devices seek only to dampen or "tune out" periodic pulsations. None is adapted to attenuating the extremely long wave of a nuclear blast.

SUMMARY OF THE INVENTION

The present attenuator comprises an axially arranged bundle of parallel tubes enclosed in a housing having a removable top portion to provide easy access to the enclosed tubes. The tubular arrangement creates a large length-to-diameter ratio of the housing and the greater the ratio, the greater the attenuation.

OBJECTS OF THE INVENTION

It is an object of the present invention to provide a shock wave attenuator which is not opaque with respect to the flow field.

A further object is to provide an attenuator which offers minimal resistance to normal airflow.

An additional objective of the present invention is to provide an effective shock wave attenuator simple in design, easily maintained and readily installed.

Other objects, advantages, and novel features of the invention will become apparent from the following detailed description of the invention when considered in conjunction with the accompanying drawings.

DESCRIPTION OF THE PREFERRED EMBODIMENT

Figure 1:
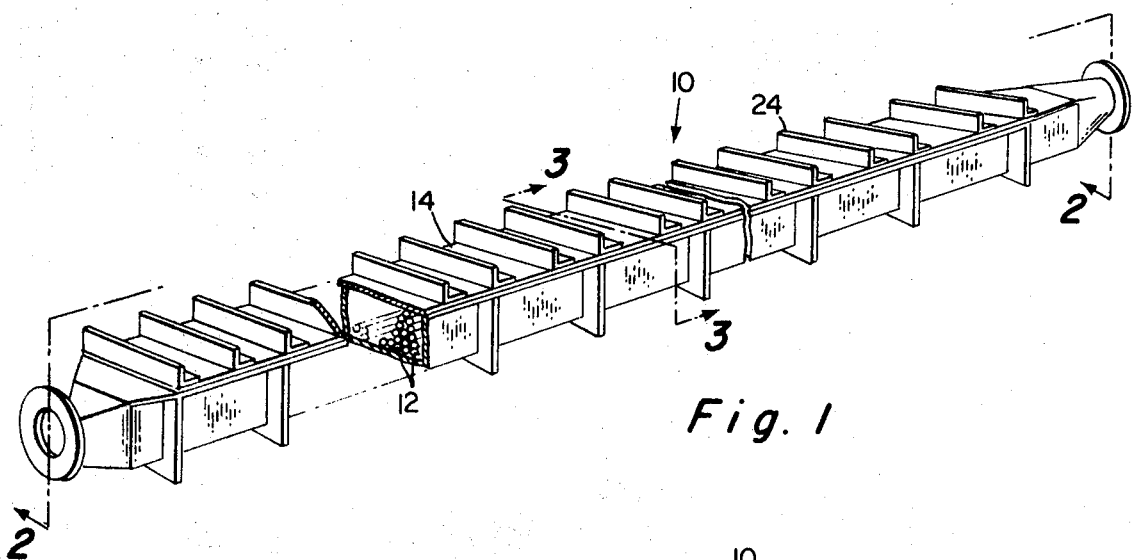
FIG. 1 is a perspective view of the present boundary layer attenuator with a portion cutaway to expose the enclosed tubes.

The present attenuator 10 as illustrated in the drawings is quite simple. In essence it is a duct section in an airflow unit which has been replaced by an axially arranged bundle of parallel tubes 12 enclosed in a suitable housing 14. Such an attenuator is easily maintained, has no moving parts and is readily installed in most existing facilities. Under normal circumstances the blast or shock wave enters the attenuator 10 at 16 and exits at 18.

Figure 2:
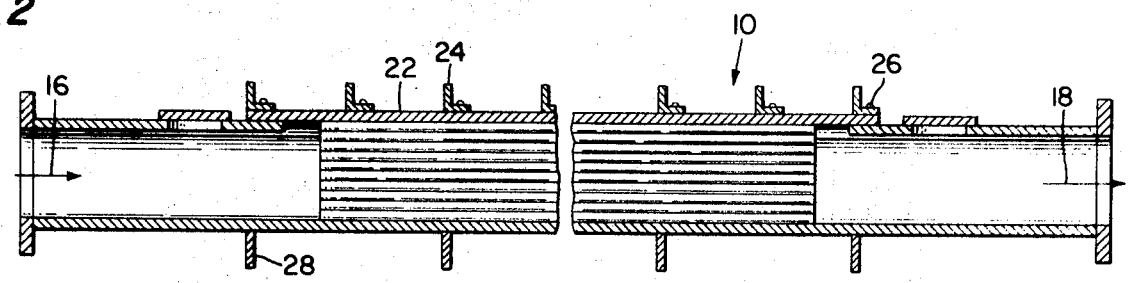
FIG. 2 is a longitudinal sectional view of the attenuator taken along the lines 2-2 of FIG. 1.
Figure 3:
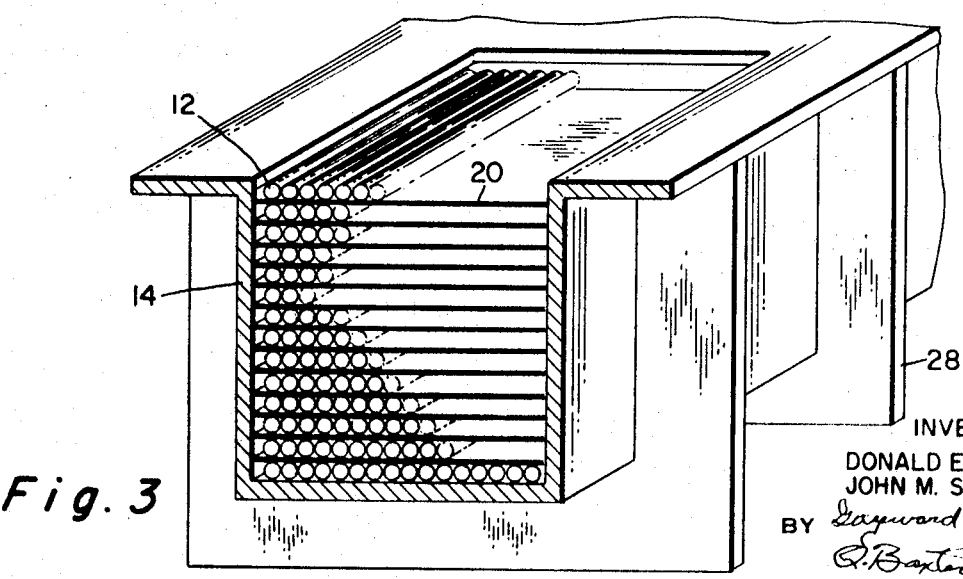
FIG. 3 is a sectional view of the apparatus shown in FIG. 1 taken along the line 3-3 of FIG. 1.

As shown best in FIGS. 2 and 3, the housing 14 is elongated and of rectangular configuration. However, it is understood that it may be of any desired shape depending on the space and shape of the facility into which it is incorporated.

Referring to FIG. 3 the tubes 12 are positioned in closely adjacent parallel relationship within housing 14. They are arranged in a plurality of rows with spacer plates 20 placed between each row of tubes to provide tube support and provide strength and structural uniformity within the housing. The tubes may be of substantially the same length as the housing 14 within which they are mounted and of relatively small diameter. The effect of this arrangement is to create a large length-to-diameter ratio in relation to the housing 14 even though both the housing and tubes are of relatively short actual length. The nested layers of tubes may be held in position by any suitable means as by spot welding or by clamping within housing 14. The tubes may be constructed of any material sufficiently strong to withstand the shock wave which may enter therein.

Housing 14 may be provided with a removable top plate 22 which is held in place by a series of angle stiffeners 24 fastened by bolts 26. These angle stiffeners may also serve to retain tubes 12 in position by simple compression. The circumferential stiffeners 28 bounding the housing 14 are adapted to resist loading of the attenuator 10.

THEORY OF OPERATION

As was stated previously, the present attenuator 10 employs small-diameter tubes 12, therefore, a very large length-to-diameter ratio may be created within a relatively short section of housing length. Such an arrangement is effective in providing significant shock attenuation characteristics. As the shock front passes into the undisturbed gas in the tubes, it discontinuously increases the pressure and temperature of the gas. Viscous attenuation is a function of boundary layer development which in turn is inversely proportional to tube diameter. In a steady supersonic flow situation, interaction results in the formation of shock bifurcations at the wall of tube 12. If the tube 12 length-to-diameter ratio is large, boundary layer growth will cause the normal part of the shock to grow progressively smaller and to weaken accordingly.

In the nonsteady-flow situation which is of concern in blast situations, the gas immediately behind the shock front has not had time to be influenced by the boundary surface. As a result, the molecules which interact with those along the boundary surface do so with maximum kinetic force and velocity. The greatest rate of heat and momentum transfer occurs where the shock front meets the boundary surface. Therefore, the internal kinetic and flow energy of the reflecting gas molecules are progressively reduced as a boundary layer is formed behind the front. As the wave advances in the tube viscous interaction with the boundary surface causes the kinetic energy behind the shock front to be changed to potential energy which is not recovered at the front. The rate of this conversion process is inversely proportional to the diameter of the tube. In essence flow downstream from the shock front is choked by boundary layer formation and the shock wave is attenuated as momentum effects of flow velocity are diminished In use this invention may be employed in at least three ways. First, it can function directly as an attenuator in a full supersonic flow field. Second, it is even more effective in a restricted flow field. Third, this attenuator may be used in a blast delay duct to reduce blast loading on the valve and to shorten the length of the duct because the blast wave velocity is slowed significantly as it passes through the attenuator.

We claim:

1. An attenuator for shock waves of very great magnitude and adaptable for direct incorporation in an air duct in which the shock wave enters one end and exits at the other comprising:

a housing;

a multiplicity of parallel tubes axially positioned and enclosed in said housing, said tubes being of small diameter and constructed of any material sufficiently strong to withstand said shock wave, such arrangement creating a very large length-to-diameter ratio of the housing which is responsive for the attenuation of the entering shock wave by choking the shock front though boundary layer formation.

2. An attenuator for shock waves of very great magnitude and adaptable for direct incorporation in an air duct in which the shock wave enters one end and exits at the other comprising:

a housing;

a removable top plate mounted on said housing;

a series of spaced angle stiffeners adapted to hold the top plate in position;

a multiplicity of parallel tubes axially positioned and enclosed in said housing, said tubes being of small diameter, and a series of spaced circumferential stiffeners added to resist internal loading of the attenuator, such arrangement creating a very large length-to-diamter ratio of the housing which is responsible for the attenuation of the entering shock wave by choking the shock front through boundary layer formation.

3. An attenuator for shock waves of very great magnitude and adaptable for direct incorporation in an air duct in which the shock wave enters one end and exits at the other comprising:

a multiplicity of parallel tubes axially positioned and enclosed in said housing, and positioned closely adjacent one to the other in a parallel arrangement in a plurality of rows; and spacer plates being positioned between each row of tubes to distribute the retaining pressure of the tubes in an equal manner;

such arrangement creating a very large length-to-diameter ratio of the housing which is responsible for the attenuation of the entering shock wave by choking the shock front through boundary layer formation.

4. A shock wave attenuator as defined in claim 1 wherein:

the tubes are substantially the same length as the housing in which they are positioned.

5. An attenuator for shock waves of great magnitude adaptable for incorporation in an air duct in which the shock wave enters at one end and exits at the other comprising:

an elongated housing;

a plurality of elongated tubes of small diameter axially positioned in an adjacent parallel arrangement in said housing and extending substantially throughout the length thereof said tubes constructed of any material sufficiently strong to withstand said shock wave;

said tubes forming numerous passageways through the housing and creating a large length-to-diameter ratio of the housing which attenuates any entering shock wave by choking the shock front through boundary layer formation.

UNITED STATES PATENT OFFICE
CERTIFICATE OF CORRECTION

Patent No. 3,583,523                Dated    8 June 1971

Inventor(s) Donald E. Williams and John M. Stephenson

It is certified that error appears in the above-identified patent and that said Letters Patent are hereby corrected as shown below:

In the claims, Claim 1, column 3, line 7, "responsive" should be --responsible--. Claim 1, column 3, line 9, "though" should be --through--.

Signed and sealed this 21st day of March 1972.

(SEAL)
Attest:

EDWARD M. FLETCHER, JR.
Attesting Officer

ROBERT GOTTSCHALK
Commissioner of Patents